(12) United States Patent
Kikuchi (10) Patent No.: US 8,989,574 B2
(45) Date of Patent: Mar. 24, 2015

(54) METHOD AND DEVICE FOR MONITORING WDM SIGNAL LIGHT

(75) Inventor: Baku Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 356 days.

(21) Appl. No.: 12/900,802

(22) Filed: Oct. 8, 2010

(65) Prior Publication Data

US 2011/0085798 A1    Apr. 14, 2011

(30) Foreign Application Priority Data

Oct. 13, 2009  (JP) .................. 2009-235985

(51) Int. Cl.
*H04B 17/00* (2006.01)
*H04B 10/077* (2013.01)
*H04J 14/02* (2006.01)

(52) U.S. Cl.
CPC ........ *H04B 10/0775* (2013.01); *H04J 14/0221* (2013.01)
USPC ................. 398/34; 398/33; 398/14

(58) Field of Classification Search
CPC .............. H04B 10/0775; H04B 10/07957
USPC .............................. 398/34, 32, 33
See application file for complete search history.

(56) References Cited

U.S. PATENT DOCUMENTS

| | | | |
|---|---|---|---|
| 6,292,289 B1* | 9/2001 | Sugaya et al. | 359/337 |
| 6,529,316 B1* | 3/2003 | Treyz et al. | 359/337.11 |
| 6,819,875 B2* | 11/2004 | Touma | 398/177 |
| 6,839,523 B1* | 1/2005 | Roberts | 398/177 |
| 6,959,149 B2* | 10/2005 | Bragg et al. | 398/26 |
| 7,027,210 B2* | 4/2006 | Tian et al. | 359/333 |
| 7,099,595 B2* | 8/2006 | Touma | 398/177 |
| 7,171,130 B2* | 1/2007 | Fishteyn et al. | 398/212 |
| 7,343,102 B2* | 3/2008 | Tomofuji et al. | 398/160 |
| 7,580,631 B2* | 8/2009 | Shimada | 398/30 |
| 7,596,320 B2* | 9/2009 | Gottwald et al. | 398/94 |
| 7,606,488 B2* | 10/2009 | Sugaya | 398/34 |
| 8,004,751 B2* | 8/2011 | Onaka et al. | 359/334 |
| 8,238,745 B2* | 8/2012 | Oguma | 398/34 |
| 8,280,244 B2* | 10/2012 | Sugawara | 398/4 |
| 2002/0131116 A1* | 9/2002 | Shimomura et al. | 359/124 |
| 2003/0030859 A1* | 2/2003 | Youn et al. | 359/110 |
| 2003/0035171 A1* | 2/2003 | Touma | 359/124 |
| 2003/0169957 A1* | 9/2003 | Deutsch | 385/14 |
| 2005/0041968 A1* | 2/2005 | Takahashi | 398/30 |
| 2006/0018658 A1* | 1/2006 | Mori | 398/79 |
| 2007/0053650 A1* | 3/2007 | Shimada et al. | 385/140 |
| 2007/0269215 A1* | 11/2007 | Sugaya | 398/95 |
| 2008/0089681 A1* | 4/2008 | Yano | 398/33 |
| 2008/0253762 A1* | 10/2008 | Bai et al. | 398/34 |

(Continued)

FOREIGN PATENT DOCUMENTS

| | | |
|---|---|---|
| JP | 11-55700 A | 2/1999 |
| JP | 2001168841 A | 6/2001 |

*Primary Examiner* — Ken Vanderpuye
*Assistant Examiner* — Amritbir Sandhu
(74) *Attorney, Agent, or Firm* — Sughrue Mion, PLLC (57) ABSTRACT

A WDM signal light monitoring device includes a first monitor for monitoring input-side WDM main signal light and output-side WDM main signal light for each wavelength; and a second monitor for monitoring the first monitor by comparing a monitoring result received from an upstream WDM transmission device with a monitoring result of the first monitor, wherein the monitoring result of the first monitor is transmitted to a downstream WDM transmission device in the system.

20 Claims, 6 Drawing Sheets

(56) References Cited

U.S. PATENT DOCUMENTS

| | | |
|---|---|---|
| 2008/0253763 A1* | 10/2008 | Uda et al. .................. 398/34 |
| 2009/0016726 A1* | 1/2009 | Suzuki et al. ............... 398/79 |
| 2009/0142052 A1* | 6/2009 | Pegg et al. .................. 398/26 |
| 2009/0162067 A1* | 6/2009 | Kobayashi et al. .......... 398/79 |
| 2009/0190204 A1* | 7/2009 | Onaka et al. ............... 359/334 |
| 2009/0190920 A1* | 7/2009 | Ohtani ........................ 398/7 |
| 2011/0286745 A1* | 11/2011 | Sugahara et al. ........... 398/48 |
| 2011/0317999 A1* | 12/2011 | Tanaka ........................ 398/34 |
| 2012/0002962 A1* | 1/2012 | Tosaki ......................... 398/34 |
| 2012/0008942 A1* | 1/2012 | Kikuchi ....................... 398/34 |
| 2012/0219289 A1* | 8/2012 | Hayashi et al. ............. 398/34 |
| 2012/0263459 A1* | 10/2012 | Komiya ....................... 398/34 |

* cited by examiner

METHOD AND DEVICE FOR MONITORING WDM SIGNAL LIGHT

This application is based upon and claims the benefit of priority from Japanese Patent Application No. 2009-235985, filed on Oct. 13, 2009, the disclosure of which is incorporated herein in its entirety by reference.

BACKGROUND OF THE INVENTION

1. Field of the Invention

The present invention relates to an optical transmission system using wavelength division multiplexing (WDM) and a WDM transmission device such as an optical node or optical repeater used in the optical transmission system and, more particularly, to a WDM transmission device having signal light monitoring functionality and a signal light monitoring method for the device.

2. Description of the Related Art

In WDM optical transmission systems using the technologies of multiplexing a plurality of optical signals of different wavelengths onto a single optical fiber, various add-drop multiplexers (ADM) and optical repeaters having signal light monitoring functionality have been proposed.

For example, Japanese Patent Application Unexamined Publication No. H11-055100 discloses an optical ADM having an optical-signal fault monitoring means which detects a fault from received optical signals at different wavelengths, which are obtained by wavelength-demultiplexing input WDM light.

Moreover, Japanese Patent Application Unexamined Publication No. 2001-168841 discloses a WDM optical amplifier which is provided with an optical splitting section disposed at either of the input or output stage of the optical amplifier, a monitor circuit which monitors different-wavelength lights obtained by demultiplexing WDM light on a wavelength basis, and a computation circuit which controls, based on the monitoring result, any one of a variable optical attenuator and gain flattening filter disposed at the output stage, whereby the gain profile of the output light is flattened in wavelength terms.

However, the WDM transmission devices as described above cannot effectively perform signal light monitoring when an abnormality (or fault) occurs in a route between the input port of the WDM transmission device and the input of the monitoring means. For example, in both of the cases where an optical signal actually does not exist and where an abnormality has occurred in the route, the optical signal cannot be detected and therefore the monitoring means issues the same alarm. In other words, the monitoring means cannot discriminate between causes of a fault when an optical signal actually does not exist and when an abnormality has occurred in the route. Hence, signal light monitoring with high precision cannot be realized.

Moreover, the WDM transmission devices as described above cannot monitor an optical signal for a fault when an abnormality occurs in the device's monitoring means itself. Alternatively, due to a monitoring malfunction, there may be a situation in which no alarm is issued when it should be, or, conversely, an alarm is issued when it should not be. Such a situation results in degraded reliability.

SUMMARY OF THE INVENTION

Accordingly, an object of the present invention is to provide a method and device for monitoring WDM signal light in a WDM transmission device that can achieve signal light monitoring with high precision and high reliability.

According to the present invention, a device for monitoring wavelength division multiplexing (WDM) signal light in a WDM transmission system, include: a first monitor for monitoring input-side WDM main signal light and output-side WDM main signal light for each wavelength; and a second monitor for monitoring the first monitor by comparing a monitoring result received from an upstream WDM transmission device with a monitoring result of the first monitor, wherein the monitoring result of the first monitor is transmitted to a downstream WDM transmission device in the system.

According to the present invention, a method for monitoring signal light in a wavelength division multiplexing (WDM) transmission device which transmits WDM signal light, includes the steps of: at a first monitor, monitoring input-side WDM main signal light and output-side WDM main signal light for each wavelength; and at a second monitor, monitoring the first monitor by comparing a monitoring result received from an upstream WDM transmission device with a monitoring result of the first monitor, wherein the monitoring result of the first monitor is transmitted to a downstream WDM transmission device in the system.

According to the present invention, a computer-readable program stored in a recording medium, for instructing a program-controlled processor to monitor signal light in a wavelength division multiplexing (WDM) transmission device which transmits WDM signal light, the program includes: at a first monitor, monitoring input-side WDM main signal light and output-side WDM main signal light for each wavelength; and at a second monitor, monitoring the first monitor by comparing a monitoring result received from an upstream WDM transmission device with a monitoring result of the first monitor, wherein the monitoring result of the first monitor is transmitted to a downstream WDM transmission device in the system.

According to the present invention, it is possible to realize signal light monitoring with high precision and high reliability.

DETAILED DESCRIPTION OF THE PREFERRED EMBODIMENTS

Hereinafter, exemplary embodiments to implement the present invention will be described in detail with reference to the accompanying drawings. Note that the present invention is not limited to the embodiments described below.

1. First Exemplary Embodiment

1.1) WDM Transmission Device

Figure 1:
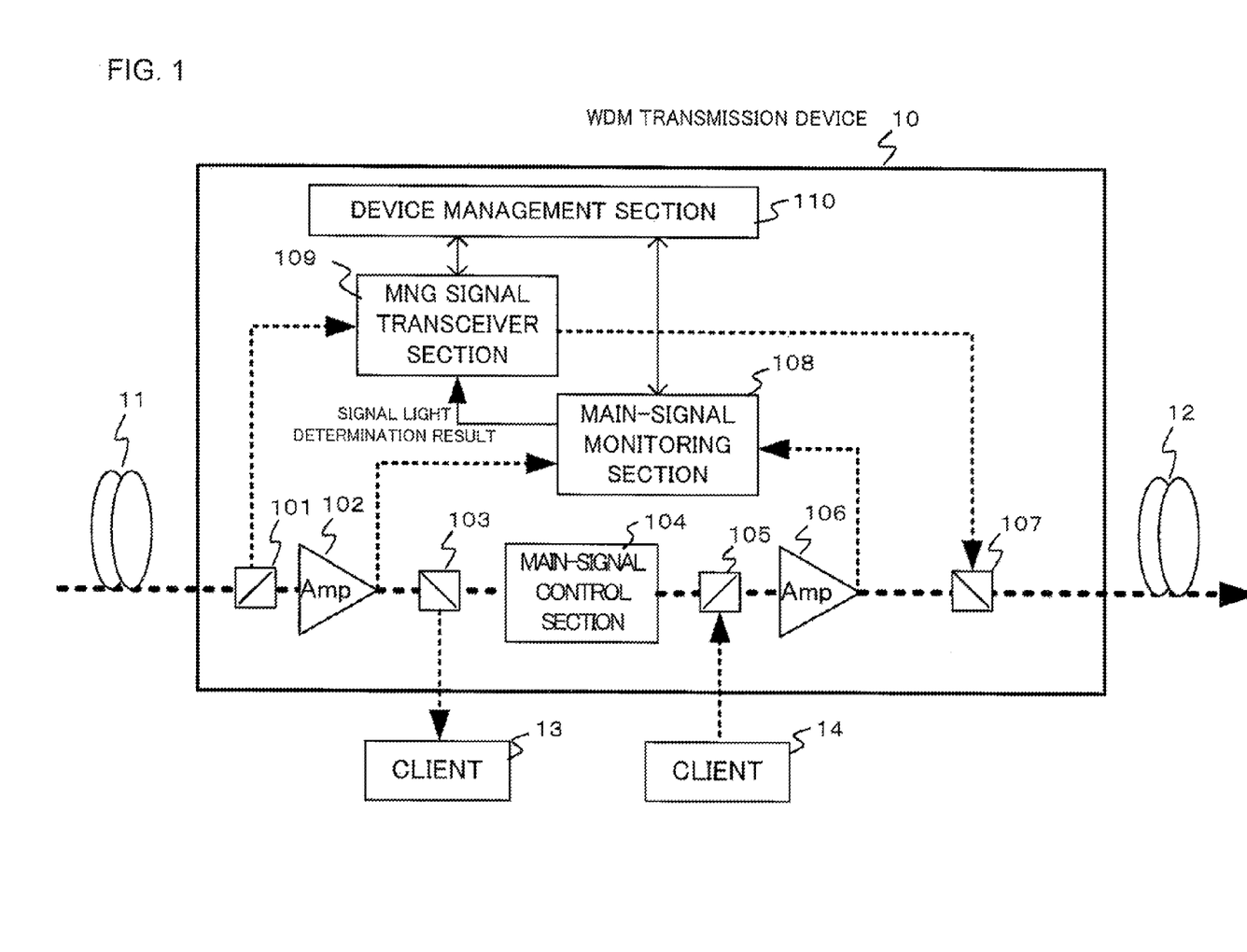
FIG. 1 is a schematic block diagram showing a functional configuration of a WDM transmission device according to a first exemplary embodiment of the present invention.

Referring to FIG. 1, a WDM transmission device 10 is connected to an upstream WDM transmission device through an optical transmission line 11 and to a downstream WDM transmission device through an optical transmission line 12. The optical transmission lines 11 and 12 are optical fiber cable. Moreover, it is assumed that the WDM transmission device 10 has an ADM function of dropping an optical signal of a predetermined wavelength to output it to a client 13 and adding an optical signal of a predetermined wavelength inputted from a client 14 for transmission. Further, it is assumed hereinafter that main signal light of WDM signal light uses the C-Band or L-Band and management signal light, which will be described later, uses an arbitrary wavelength band where no interference occurs with the main signal light.

The WDM signal light received through the optical transmission line 11 passes through an optical splitting section 101 and enters an input-stage optical amplifier 102. The input-stage optical amplifier 102 amplifies the WDM signal light and outputs the amplified WDM signal light to a main-signal control section 104 through an optical splitting section 103. The main-signal control section 104 performs level equalization control to maintain the main-signal characteristics of the signal light input from the input-stage optical amplifier 102. The WDM signal light subjected to level equalization at the main-signal control section 104 is output, through an optical multiplexing section 105, to an output-stage optical amplifier 106. The output-stage optical amplifier 106 amplifies the level-equalized WDM signal light and then transmits it to the optical transmission line 12 through an optical multiplexing section 107.

A main-signal monitoring section 108 receives as inputs the output light from each of the input-stage optical amplifier 102 and output-stage optical amplifier 106 and performs monitoring operation (first monitoring) using these input-side and output-side WDM signal lights. More specifically, the main-signal monitoring section 108 compares, for each wavelength, the input-side and output-side signals with a predetermined threshold value, thereby determining the presence or absence of signal light and, at the same time, detecting an abnormality in optical circuits on the input side and output side. It should be noted that the term "abnormality" used in the description should be given interpretation reasonable in the present technical field, including not only optical or electrical disconnection but also not-normally operation of an optical or electrical circuit, such as fault, failure, malfunction or the like.

Moreover, the main-signal monitoring section 108 refers to path information on each wavelength (information about a route on the wavelength in question) input from a device management section 110, thereby determining whether or not the main signal of each wavelength agrees with the path information. When they do not agree, a notification to that effect is made to the device management section 110. Additionally, the main-signal monitoring section 108 outputs the result of signal light determination to a management signal transceiver section 109. A specific example will be described later.

The optical splitting section 101 splits the input WDM signal light and the management signal transceiver section 109 receives the management signal light of the predetermined wavelength band. The management signal transceiver section 109 compares the management signal with the own device's result of signal light determination, thereby determining whether or not the own device operates normally (second monitoring). Moreover, the management signal transceiver section 109 generates, from the own device's result of signal light determination, management signal light of the predetermined wavelength band, which is wavelength-multiplexed with the main signal light by the optical multiplexing section 107 and sent to the downstream WDM transmission device through the optical transmission line 12. The details thereof will be described later.

The device management section 110 controls the main-signal monitoring section 108 and management signal transceiver section 109. Here, it is assumed that the device management section 110 outputs the path information on each wavelength, which is information about a route on a wavelength in question, to the main-signal monitoring section 108. As will be described later, when the occurrence of an abnormality is notified, the device management section 110 issues an alarm according to the type of abnormality, thereby notifying a user.

Figure 2:
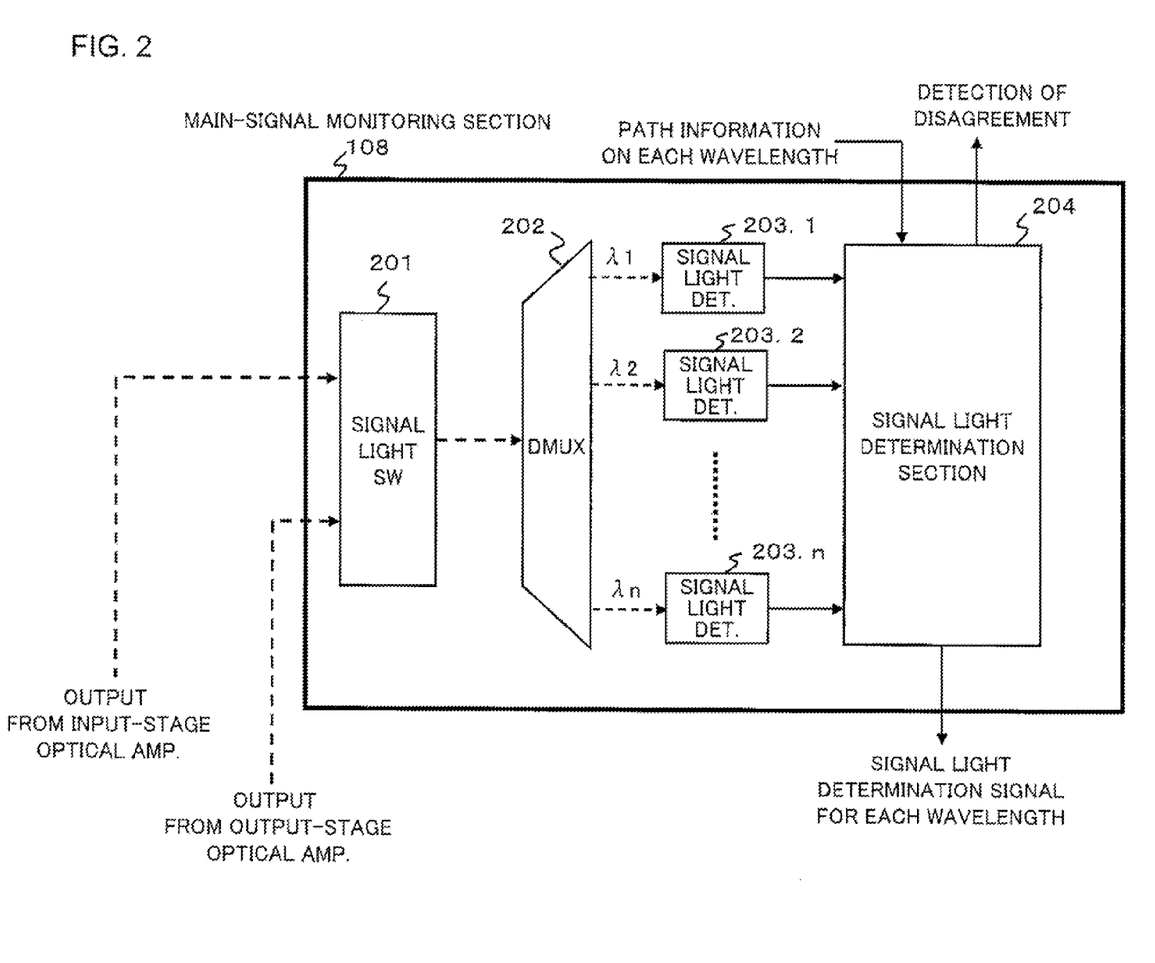
FIG. 2 is a block diagram showing an example of the functional configuration of a main-signal monitoring section in FIG. 1.

Referring to FIG. 2, the main-signal monitoring section 108 includes a signal light switching section 201 which inputs the output light of the input-stage optical amplifier 102 and output-stage optical amplifier 106 to output a selected one to a demultiplexer 202. The demultiplexer 202 demultiplexes the selected signal light into n (n is an integer not smaller than one) wavelengths $\lambda 1$ to $\lambda n$ of the main signal light. Signal light detection sections 203.1 to 203.$n$, which are respectively provided for the individual wavelengths, each receive the signal light that is a demultiplexed component, convert it into an electrical signal, and output the electrical signal to a signal light determination section 204. Accordingly, the input-side received optical signals of the individual wavelengths are output to the signal light determination section 204 when the signal light switching section 201 selects the output light of the input-stage optical amplifier 102, and the output-side received optical signals of the individual wavelengths are output to the signal light determination section 204 when the signal light switching section 201 selects the output light from the output-stage optical amplifier 106.

The signal light determination section 204 monitors the levels of the output-side and input-side received optical signals of the individual wavelengths, which will be described next, and also monitors a monitoring circuit system by referring to the path information from the device management section 110.

1.2) First Monitoring Operation

Hereinafter, an example of the first monitoring operation performed by the device management section 110 and main-signal monitoring section 108 will be described specifically with reference to FIG. 3. Note that it is also possible to implement functions equivalent to this first monitoring operation by executing computer programs, which are stored in a storage medium or may be downloaded through networks, on a program-controlled processor such as a CPU (central processing unit).

Figure 3:
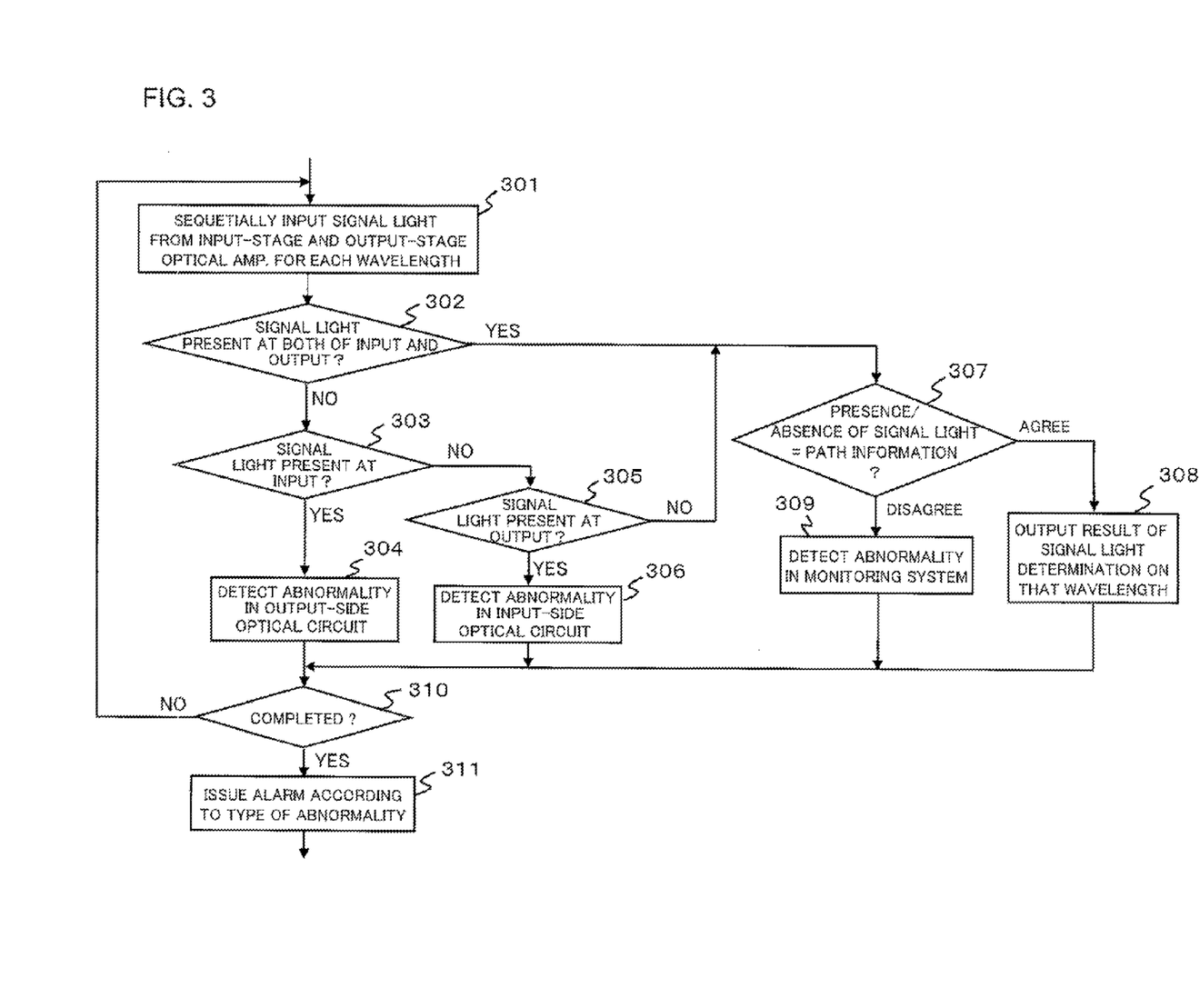
FIG. 3 is a flowchart showing intra-device monitoring operation of the WDM transmission device shown in FIG. 1.

Referring to FIG. 3, the main-signal monitoring section 108, in accordance with control by the device management section 110, sequentially selects the output light from the input-stage optical amplifier 102 and the output light from the output-stage optical amplifier 106 through the signal light switching section 201 and stores in the signal light determination section 204 the input-side and output-side received optical signals of the individual wavelengths. Subsequently, the input-side and output-side received optical signals are sequentially read out for each wavelength, and the following processing is performed.

First, the signal light determination section 204 reads out input-side and output-side received optical signals of one wavelength (Step 301). The signal light determination section 204 decides the presence or absence of the signal light of this wavelength by comparing each of the levels of these received optical signals with a predetermined threshold level, determining whether or not both of the levels of the input-side and output-side received optical signals are equal to or higher than the predetermined threshold level (Step 302). If one or both of the levels of the input-side and output-side received optical signals are not equal to or higher than the predetermined threshold level (Step 302: NO), the signal light determination section 204 further determines whether or not the level of the input-side received optical signal is equal to or higher than the predetermined threshold level (Step 303).

If the level of the input-side received optical signal is equal to or higher than the predetermined threshold level (Step 303: YES), the signal light determination section 204 determines that there is an abnormality in the output-side optical circuit between the optical amplifier 106 and the main-signal monitoring section 108 and/or between the main-signal control section 104 and the optical amplifier 106 because a signal of the wavelength in question exists on the input side but no signal light appears on the output side, and retains that abnormality information (Step 304).

On the other hand, if the level of the input-side received optical signal is below the predetermined threshold level (Step 303: NO), the signal light determination section 204 further determines whether or not the level of the output-side received optical signal is equal to or higher than the predetermined threshold level (Step 305). If the level of the output-side received optical signal is equal to or higher than the predetermined threshold level (Step 305: YES), the signal light determination section 204 determines that there is an abnormality in the input-side optical circuit between the optical amplifier 102 and the main-signal monitoring section 108 because a signal of the wavelength in question exists on the output side but no signal light is detected on the input side, and retains that abnormality information (Step 306).

If both of the levels of the input-side and output-side received optical signals are equal to or higher than the predetermined threshold level (Step 302: YES), or if both of the levels of the input-side and output-side received optical signals are below the predetermined threshold level (Step 305: NO), the signal light determination section 204 determines whether or not the presence or absence of the signal light of the wavelength in question agrees with the path information on this wavelength (Step 307). If they agree (Step 307: AGREE), the signal light determination section 204 outputs the result of signal light determination (presence/absence) on this wavelength to the management signal transceiver section 109 (Step 308). If they disagree (Step 307: DISAGREE), the signal light determination section 204 determines that there is an abnormality in any of the signal light switching section 201, demultiplexer 202, and light-receiving system in the main-signal monitoring section 108, and retains the abnormality information (Step 309).

The signal light determination section 204 sequentially performs the above-described Steps 301 to 309 for each wavelength (Step 310: NO). When the determination is performed for all of the wavelengths and completed (Step 310: YES), the signal light determination section 204 notifies the device management section 110 of the abnormality information detected in any of Steps 304, 306 and 309, and the device management section 110 outputs an alarm according to the type of abnormality (Step 311). A user is notified by the alarm specifying the place of an abnormality, which is, here, any of the output-side optical circuit (Step 304), input-side optical circuit (Step 306), and monitoring circuit system (Step 309).

Note that for the determination as to whether or not the information about the presence/absence of signal light agrees with the path information in Step 307, it is also possible to determine whether or not the number of presences of signal light (the number of wavelengths) agrees with the path information. For example, the signal light determination section 204 can obtain the number of wavelengths by counting the times it is determined in Step 302 that both of the levels of the input-side and output-side received optical signals are equal to or higher than the predetermined threshold level.

1.3) Second Monitoring Operation

Hereinafter, an example of the second monitoring operation performed by the device management section 110 and management signal transceiver section 109 will be described specifically with reference to FIGS. 4 and 5. Note that it is also possible to implement functions equivalent to this second monitoring operation by executing computer programs, which are stored in a storage medium or may be downloaded through networks, on a program-controlled processor such as a CPU. Considered here will be a WDM optical transmission system in which a plurality of WDM transmission devices are connected in series through an optical transmission line.

Figure 5:
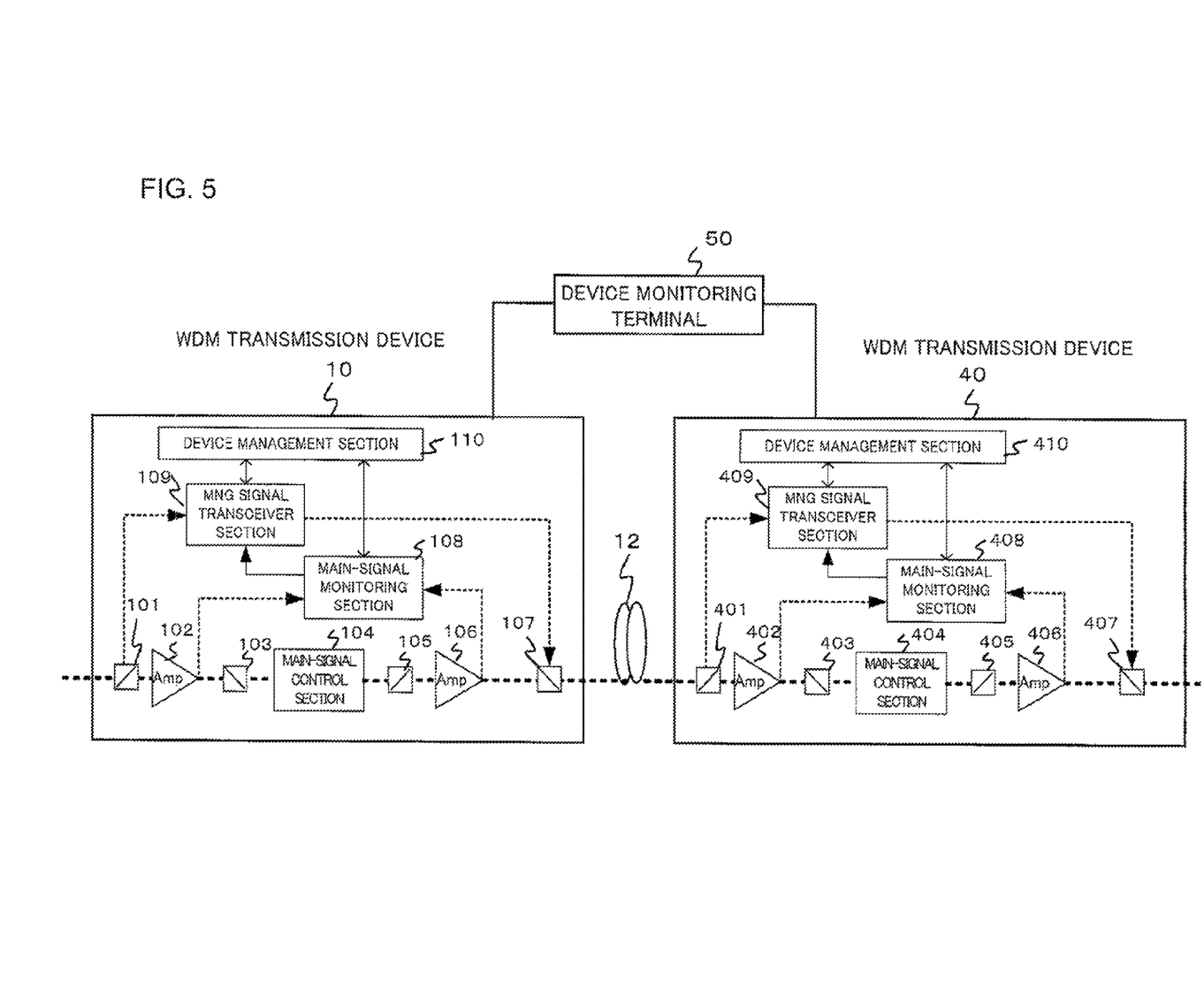
FIG. 5 is a system configuration diagram showing part of an optical transmission system including the WDM transmission devices shown in FIG. 1.

Referring to FIG. 5, it is assumed that the WDM transmission device 10 and a WDM transmission device 40 are connected to each other through the optical transmission line 12. The WDM transmission devices 10 and 40 have basically the same circuit configurations and functions. Therefore, it is assumed that the components of the WDM transmission device 40 corresponding to the components (denoted by reference numerals 101 to 110) of the WDM transmission device 10 are denoted by reference numerals 401 to 410, respectively. Each WDM transmission device in the optical transmission system is monitored by a device monitoring terminal 50.

As described earlier, when the management signal transceiver section 109 of the WDM transmission device 10 receives as an input a result of signal light determination (presence/absence) on each wavelength from the main-signal monitoring section 108, the management signal transceiver section 109 generates a management signal bearing that result of signal light determination and wavelength-multiplexes the management signal with the main signal, which are then sent out to the downstream WDM transmission device 40 through the optical transmission line 12. The inter-device monitoring operation will be described with reference to FIG. 4 by using as an example the WDM transmission device 40 that has received this management signal.

Figure 4:
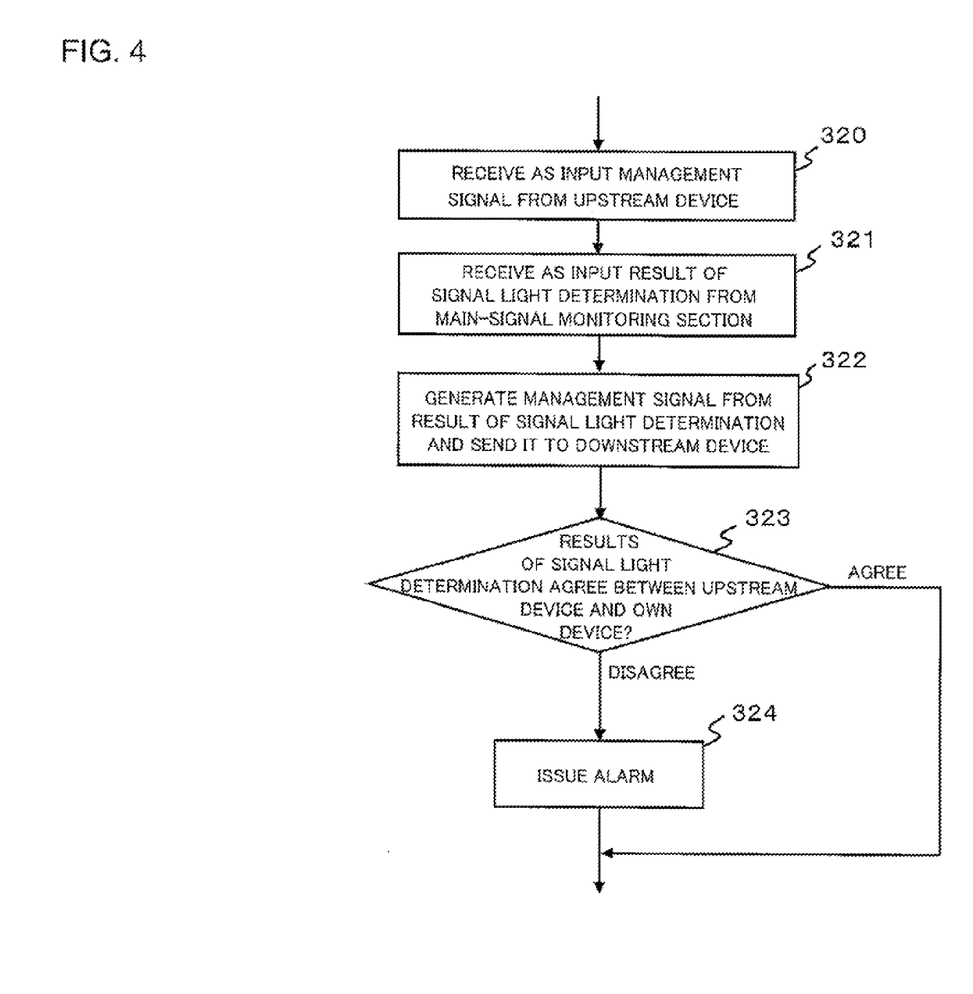
FIG. 4 is a flowchart showing inter-device monitoring operation of the WDM transmission device shown in FIG. 1.

Referring to FIG. 4, the signal light that has arrived through the optical transmission line 12 is split by the optical splitting section 401 and input to the management signal transceiver section 409. The management signal transceiver section 409, upon receipt of the management signal in the predetermined wavelength band as an input, reads from the management signal and stores the result of signal light determination obtained by the upstream WDM transmission device 10 (Step 320).

Next, the management signal transceiver section 409 inputs a result of signal light determination (presence/absence) on each wavelength from the main-signal monitoring section 408 (Step 321) and, as described above, generates a management signal bearing that result of signal light determination and wavelength-multiplexes the management signal with the main signal, which are then sent to a further downstream WDM transmission device (Step 322). In parallel with this operation, the management signal transceiver section 409 compares, for each wavelength, the upstream device's result of signal light determination received from the upstream WDM transmission device 10 with the own device's result of signal light determination input from the main-signal monitoring section 408 (Step 323). If the upstream device's result of signal light determination agrees with the own device's result of signal light determination (Step 323: AGREE), it is determined that the monitoring function of the own device works normally. On the other hand, when the results disagree (Step 323: DISAGREE), it is determined that an abnormality has occurred in the monitoring function of the own device, and a notification to that effect is sent to the device management section 410, by which an alarm indicating the abnormality is output (Step 324).

The above-described monitoring operation by the management signal transceiver section 409 of the WDM transmission device 40 is performed in the same manner by the management signal transceiver section 109 of the WDM transmission device 10. In such a manner, the results of signal light determination are sequentially transmitted between WDM transmission devices in the optical transmission system and compared for determination by the management signal transceiver section of each WDM transmission device, whereby signal light monitoring in the entire system can be achieved, and reliability can be increased.

1.4) Effects

According to the first exemplary embodiment of the present invention, the determination of the presence or absence of signal light is performed at two monitoring points within a device (specifically, the outputs of the input-stage and output-stage optical amplifiers). Therefore, even if an abnormality occurs in a route between the main-signal monitoring section and either of the optical amplifiers in the device with the result that no signal light can be detected, it is possible to detect such a state of abnormality and issue an alarm. Moreover, devices share information about the presence/absence of signal light (a result of signal light determination) by using a management signal. Therefore, even if an abnormality occurs in the main-signal monitoring section itself of the own device with the result that the information about the presence/absence of signal light for each wavelength does not agree between the upstream device and own device, it is possible to issue an alarm indicating that there is an abnormality.

Hence, according to the WDM transmission device of the present exemplary embodiment, it is possible to perform monitoring at a plurality of points within the device, and by transmitting the monitoring results between the devices, it is also possible to monitor the monitoring system in each device. As a result, it is possible to perform signal light monitoring with high precision and high reliability.

2. Second Exemplary Embodiment

The basic configuration of a WDM transmission device according to a second exemplary embodiment of the present invention is similar to that of the first exemplary embodiment described above. The different point is that a plurality of inputs are made to the main-signal control section and level equalization is performed after a wavelength is selected in the device. It is possible to obtain effects similar to those of the first exemplary embodiment even when the present invention is applied to such a WDM transmission device that outputs WDM signal light through wavelength selection from a plurality of WDM signal light inputs. Hereinafter, a description will be given of the case, as an example, where a device has two input systems.

Figure 6:
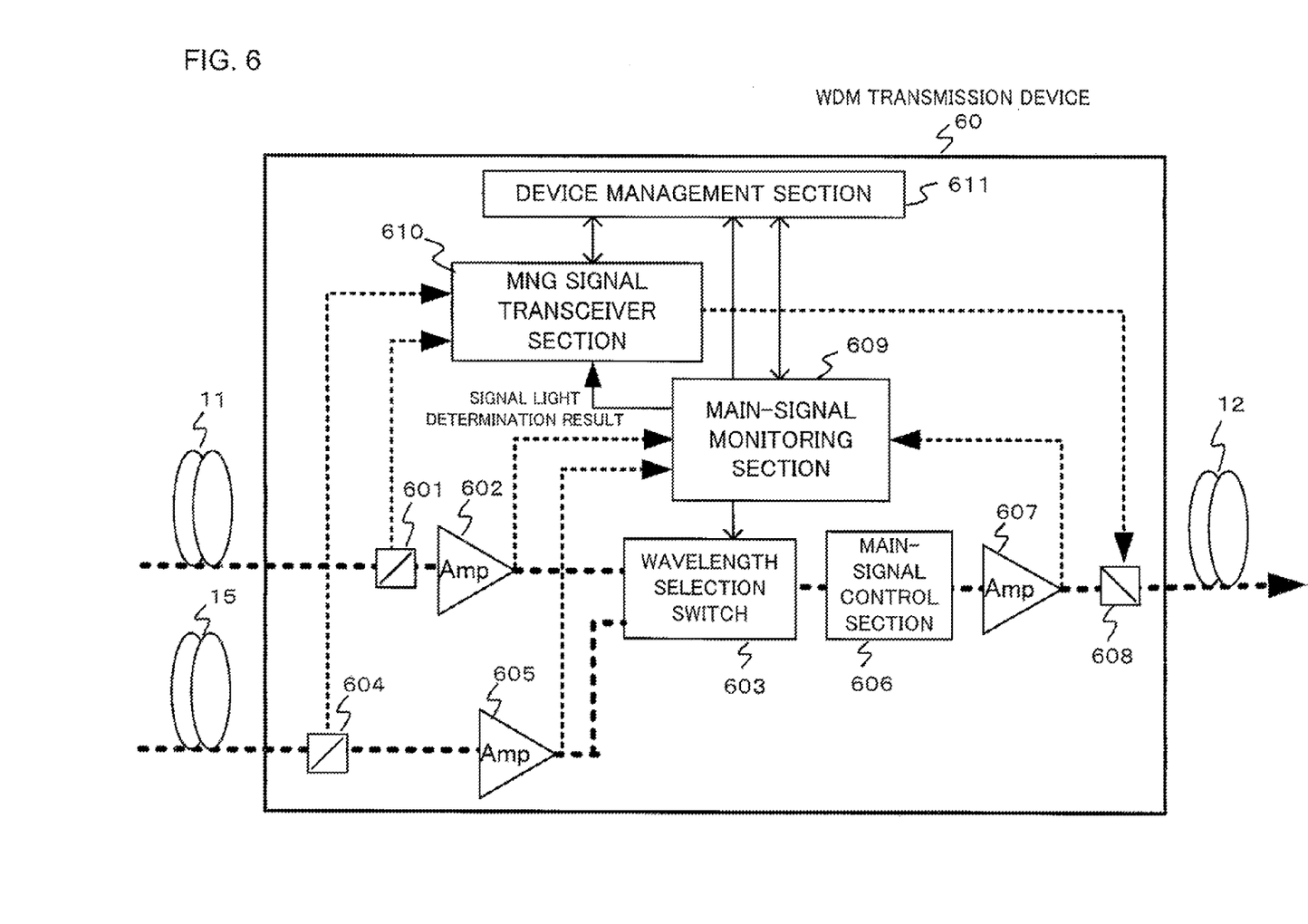
FIG. 6 is a schematic block diagram showing a functional configuration of a WDM transmission device according to a second exemplary embodiment of the present invention.

Referring to FIG. 6, it is assumed that a WDM transmission device 60 is connected to two upstream WDM transmission devices through optical transmission lines 11 and 15 respectively and connected to a downstream WDM transmission device through an optical transmission line 12.

The WDM signal light received through the optical transmission line 11 passes through an optical splitting section 601 and enters an input-stage optical amplifier 602. The input-stage optical amplifier 602 amplifies the WDM signal light and outputs the amplified WDM signal light to a wavelength selection switch 603. Similarly, the WDM signal light received through the optical transmission line 15 passes through an optical splitting section 604 and enters an input-stage optical amplifier 605. The input-stage optical amplifier 605 amplifies the WDM signal light and outputs the amplified WDM signal light to a wavelength selection switch 603.

The signal light of a wavelength selected by the wavelength selection switch 603 is output to a main-signal control section 606. The main-signal control section 606 performs level equalization control to maintain the main-signal characteristics of the signal light input from the wavelength selection switch 603. The WDM signal light subjected to level equalization at the main-signal control section 606 is output to an output-stage optical amplifier 607. The output-stage optical amplifier 607 amplifies the level-equalized WDM signal light and then transmits it to the optical transmission line 12 through an optical multiplexing section 608.

A main-signal monitoring section 609 receives as inputs the output light from each of the input-stage optical amplifiers 602 and 605 and output-stage optical amplifier 607 and performs monitoring operation using the selected input-side and output-side WDM signal lights. The configuration and functions of the main-signal monitoring section 609 are similar to those of the main-signal monitoring section 108 of the first exemplary embodiment except that the input-side WDM signal lights are subjected to selection, and therefore a detailed description thereof will be omitted.

A management signal transceiver section 610 receives a management signal in a predetermined wavelength band of the input WDM signal light from each the two systems split by the optical splitting sections 601 and 604 and compares them with the own device's result of signal light determination, thereby determining whether or not the own device operates normally. Moreover, from the own device's result of signal light determination, the management signal transceiver section 610 generates a management signal in the predetermined band, which is wavelength-multiplexed with the main signal by the optical multiplexing section 608 and sent to the down stream WDM transmission device through the optical transmission line 12. The functions of the management signal transceiver section 610 are also similar to those of the management signal transceiver section 109 of the first exemplary embodiment except that the input-side WDM signal lights are subjected to selection, and therefore a detailed description thereof will be omitted.

A device management section 611 controls the wavelength selection switch 603, main-signal monitoring section 609, and management signal transceiver section 610 and, when notified of the occurrence of an abnormality, notifies a user of the abnormality by issuing an alarm according to the type of abnormality. The basic functions of the device management section 611 are also similar to those of the device management section 110 of the first exemplary embodiment except for wavelength selection control, and therefore a detailed description thereof will be omitted.

Additionally, although two input ports are provided to the wavelength selection switch 603 in the present exemplary embodiment, the number of ports is not limited two. The present exemplary embodiment can also be applied to cases where WDM signal light beams are input to an arbitrary number of input ports respectively and subject to selection.

The present invention is applicable to WDM transmission devices included in an optical transmission system.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A device for monitoring wavelength division multiplexing (WDM) signal light in a WDM transmission device, comprising:
a first monitor for monitoring input-side WDM main signal light and output-side WDM main signal light for each wavelength to generate a first monitoring result; and
a second monitor for monitoring the first monitor by comparing a second monitoring result received from an upstream WDM transmission device with the first monitoring result, wherein the first monitoring result is transmitted to a downstream WDM transmission device in the system,
wherein the first monitor comprises:
a signal light detector for detecting presence or absence of each of the input-side WDM main signal light and the output-side WDM main signal light for each wavelength to generate the first monitoring result; and
a signal light determination section for determining a type of an abnormality occurring within the WDM transmission device, depending on the first monitoring result,
wherein the second monitor further monitors the first monitor according to the type of an abnormality,
wherein the signal light determination section determines the type of an abnormality such that
when the first monitoring result is that the input-side WDM main signal light is present and the output-side WDM main signal light is absent for a corresponding wavelength, a first type of abnormality is determined in an output-side optical circuit of the device,
when the first monitoring result is that the input-side WDM main signal light is absent and the output-side WDM main signal light is present for a corresponding wavelength, a second type of abnormality is determined in an input-side optical circuit of the device, and
when the first monitoring result is that both of the input-side WDM main signal light and the output-side WDM main signal light are absent for a corresponding wavelength or both of the input-side WDM main signal light and the output-side WDM main signal light are present for the corresponding wavelength, a third type of abnormality is determined in a light receiving system of the first monitor if the first monitoring result agrees with given path information indicating a route for the corresponding wavelength.

2. The device according to claim 1, wherein each of the first and second monitoring results is included in a management signal transmitted at a wavelength different from a wavelength used for transmission of the WDM main signal light.

3. The device according to claim 1, wherein each of the first and second monitoring results indicates presence or absence of signal light on each wavelength of the WDM main signal light.

4. The device according to claim 1, further comprising:
an input-side optical amplifier for amplifying WDM main signal light received from an upstream WDM transmission device to output the input-side WDM main signal light;
a controller for performing level control of the input-side WDM main signal light; and
an output-side optical amplifier for amplifying level-controlled WDM main signal light to output the output-side WDM main signal light.

5. The device according to claim 1, further comprising a wavelength selector for selecting the input-side WDM main signal from a plurality of WDM main signal lights which are received from a plurality of upstream WDM transmission devices, respectively.

6. A method for monitoring signal light in a wavelength division multiplexing (WDM) transmission device which transmits WDM signal light, comprising:
at a first monitor, monitoring input-side WDM main signal light and output-side WDM main signal light for each wavelength to generate a first monitoring result; and
at a second monitor, monitoring the first monitor by comparing a second monitoring result received from an upstream WDM transmission device with the first monitoring result, wherein the first monitoring result is transmitted to a downstream WDM transmission device in the system,
wherein
at the first monitor,
detecting presence or absence of both the input-side WDM main signal light and the output-side WDM main signal light for each wavelength; and
determining where an abnormality occurs within the WDM transmission device, depending on a detection result of the signal light detector, to generate the first monitoring result,
at the second monitor, further monitoring the first monitor according to the type of an abnormality,
wherein the type of an abnormality is determined such that
when the first monitoring result is that the input-side WDM main signal light is present and the output-side WDM main signal light is absent for a corresponding wavelength, a first type of abnormality is determined in an output-side optical circuit of the WDM transmission device,
when the first monitoring result is that the input-side WDM main signal light is absent and the output-side WDM main signal light is present for a corresponding wavelength, a second type of abnormality is determined in an input-side optical circuit of the WDM transmission device, and
when the first monitoring result is that both of the input-side WDM main signal light and the output-side WDM main signal light are absent for a corresponding wavelength or both of the input-side WDM main signal light and the output-side WDM main signal light are present for the corresponding wavelength, a third type of abnormality is determined in a light receiving system of the first monitor if the first monitoring result agrees with given path information indicating a route for the corresponding wavelength.

7. The method according to claim 6, wherein each of the first and second monitoring results is included in a management signal transmitted at a wavelength different from a wavelength used for transmission of the WDM main signal light.

8. The method according to claim 6, wherein each of the first and second monitoring results indicates presence or absence of signal light on each wavelength of the WDM main signal light.

9. The method according to claim 6, further comprising:
amplifying WDM main signal light received from an upstream WDM transmission device to output the input-side WDM main signal light;
performing level control of the input-side WDM main signal light; and
amplifying level-controlled WDM main signal light to output the output-side WDM main signal light.

10. The method according to claim 6, further comprising: at a wavelength selector, selecting the input-side WDM main signal from a plurality of WDM main signal lights which are received from a plurality of upstream WDM transmission devices, respectively.

11. A wavelength division multiplexing (WDM) transmission device comprising the device according to claim 1.

12. The WDM transmission device according to claim 11, wherein each of the first and second monitoring results is included in a management signal transmitted at a wavelength different from a wavelength used for transmission of the WDM main signal light.

13. The WDM transmission device according to claim 11, wherein each of the first and second monitoring results indicates presence or absence of signal light on each wavelength of the WDM main signal light.

14. The WDM transmission device according to claim 11, further comprising:
an input-side optical amplifier for amplifying WDM main signal light received from an upstream WDM transmission device to output the input-side WDM main signal light;
a controller for performing level control of the input-side WDM main signal light; and
an output-side optical amplifier for amplifying level-controlled WDM main signal light to output the output-side WDM main signal light.

15. The WDM transmission device according to claim 11, further comprising a wavelength selector for selecting the input-side WDM main signal from a plurality of WDM main signal lights which are received from a plurality of upstream WDM transmission devices, respectively.

16. A WDM transmission system comprising a plurality of WDM transmission devices each according to claim 11.

17. A non-transitory computer-readable program stored in a recording medium, for instructing a program-controlled processor to monitor signal light in a wavelength division multiplexing (WDM) transmission device which transmits WDM signal light, the program comprising:
at a first monitor, monitoring input-side WDM main signal light and output-side WDM main signal light for each wavelength to generate a first monitoring result; and
at a second monitor, monitoring the first monitor by comparing a second monitoring result received from an upstream WDM transmission device with the first monitoring result, wherein the first monitoring result is transmitted to a downstream WDM transmission device in the system,
wherein
at the first monitor,
detecting presence or absence of both the input-side WDM main signal light and the output-side WDM main signal light for each wavelength; and
determining where an abnormality occurs within the WDM transmission device, depending on a detection result of the signal light detector, to generate the first monitoring result,
at the second monitor, further monitoring the first monitor according to the type of an abnormality,
wherein the type of an abnormality is determined such that
when the first monitoring result is that the input-side WDM main signal light is present and the output-side WDM main signal light is absent for a corresponding wavelength, a first type of abnormality is determined in an output-side optical circuit of the WDM transmission device,
when the first monitoring result is that the input-side WDM main signal light is absent and the output-side WDM main signal light is present for a corresponding wavelength, a second type of abnormality is determined in an input-side optical circuit of the WDM transmission device, and
when the first monitoring result is that both of the input-side WDM main signal light and the output-side WDM main signal light are absent for a corresponding wavelength or both of the input-side WDM main signal light and the output-side WDM main signal light are present for the corresponding wavelength, a third type of abnormality is determined in a light receiving system of the first monitor if the first monitoring result agrees with given path information indicating a route for the corresponding wavelength.

18. The device according to claim 1, wherein the signal light determination section determines whether the first monitoring result agrees with the given path information, depending on whether the path information agrees with a number of wavelengths on each of which signal light is present among wavelengths of the WDM main signal light.

19. The method according to claim 6, wherein
at the first monitor, determining whether the first monitoring result agrees with the given path information, depending on whether the path information agrees with a number of wavelengths on each of which signal light is present among wavelengths of the WDM main signal light.

20. The non-transitory computer-readable program according to claim 17, wherein
at the first monitor, determining whether the first monitoring result agrees with the given path information, depending on whether the path information agrees with a number of wavelengths on each of which signal light is present among wavelengths of the WDM main signal light.

* * * * *